Patented Apr. 21, 1942

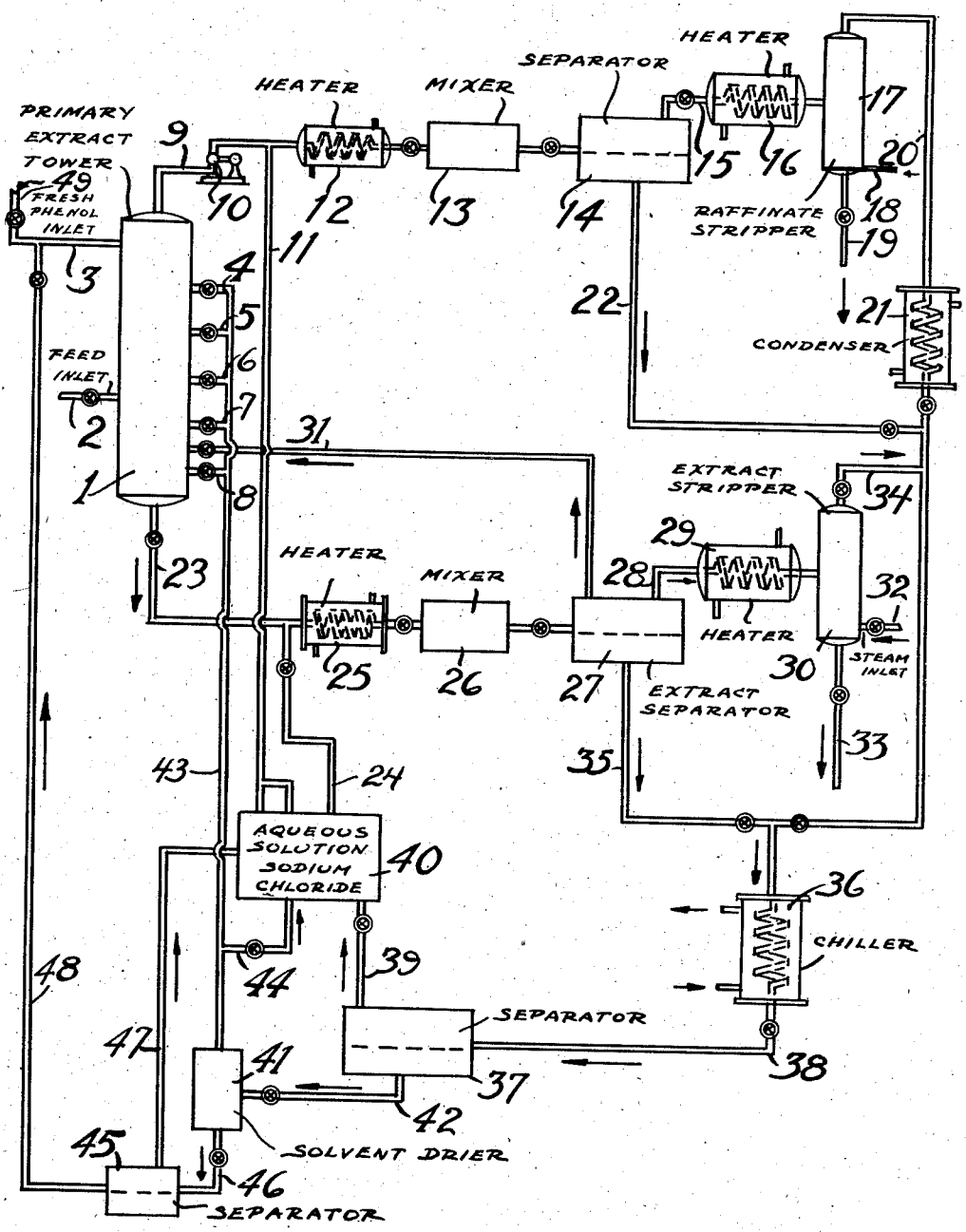

2,280,264

UNITED STATES PATENT OFFICE 2,280,264

SOLVENT TREATING PROCESS

Edward D. Reeves, Cranford, N. J., assignor to Standard Oil Development Company, a corporation of Delaware Application August 19, 1939, Serial No. 290,956

7 Claims. (Cl. 196—13)

The present invention relates to the solvent treatment of mineral oils. It is especially concerned with an improved process of solvent treating petroleum oils in which the selective solvent is recovered from the respective phases without the necessity of distillation. In accordance with the present invention petroleum oils are treated with primary solvents selected from the class of solvents which have a preferential selectivity for the relatively more aromatic or hydrogen poor constituents as compared to the relatively more paraffinic or hydrogen rich constituents under conditions to form raffinate and solvent extract phases. The respective phases are separated and treated with an aqueous inert salt solution under conditions to remove the selective solvent from the oil.

It is well known in the art to treat petroleum oils and the like with various selective solvents which have the ability to segregate these oils into their respective constituents as measured by a difference in chemical and physical properties. For example, it is known to treat petroleum oils with solvents or solvent mixtures selected from the class of solvents which have a preferential selectivity for the relatively more aromatic or hydrogen poor constituents as compared to the relatively more paraffinic or hydrogen rich constituents. Solvents of this class are, for example, phenol, furfural, sulfur dioxide, cresol, nitrobenzene, aniline, beta beta dichlor diethyl ether, and the like. It is also known to use these solvents in combination with other substances, as for example, in combination with liquid normally gaseous hydrocarbons such as propane and the like. It is also known to modify the selectivity and solvent power of the particular solvent or solvent mixture being used by the addition thereto of a solvent modifying agent such as water, alcohols, glycols, and the like. Although a batch or semi-batch operation is entirely satisfactory for contacting the oil and solvent, the usual commercial practice is to contact the oil and solvent in a countercurrent tower treating process. In this operation, the heavier phase, usually the solvent, is introduced into the top of a countercurrent treating tower, while the lighter phase, usually the oil, is introduced into the bottom or center portion of the countercurrent treating tower. These phases flow in a countercurrent relationship. Efficient contacting between the countercurrently flowing phases is usually secured by suitable contacting and distributing means, as for example, pierced plates, contacting masses, distributing trays and the like. Temperature and pressure conditions are adjusted to form a solvent poor or raffinate phase relatively highly paraffinic in nature and a solvent rich or extract phase highly aromatic in nature. The respective phases are separated and the solvent usually separated from the extract and raffinate respectively by distillation.

The removal of the solvent from the raffinate and extract phases by distillation introduces economic limitations since solvents which have desirable selectivity characteristics have relatively high latent heats of vaporization. Thus, solvent treating operations have been limited to some extent by the costs of the recovery of the selective solvent from the treated oil. In order to lower operating costs and to create a more widespread application of solvent treating operations, numerous proposals have been made in order to eliminate or modify the distillation step. For example, it has been proposed to re-extract the solvent extract and raffinate phases with various secondary solvents of relatively low latent heats and which have a preferential selectivity for the raffinate and extract respectively as compared to the primary solvent. This process likewise has not been entirely satisfactory since known secondary solvents do not completely remove the last traces of the highly aromatic constituents from the primary solvent. Thus, the concentration of the highly aromatic constituents continuously builds up in the primary solvent, necessitating replacement or purification of the same by distillation or the like. In addition, the quantity of secondary solvent required is quite large, thus off-setting to some extent the resulting economies secured by the removal of the primary solvent by re-extraction, rather than by distillation. It is also known to separate the primary selective solvent from the raffinate and solvent extract phases by the addition of various precipitants. These operations have not been used to any extent since an excessive amount of precipitant is required in order to secure fairly complete precipitation of the oil. Washing operations likewise have been employed for the recovery of the selective solvent from the respective phases. For example, it is known to remove phenol from a phenol petroleum oil mixture by treating said mixture with a relatively large amount of water which will dissolve the solvent and separate the same from the oil. These processes also are not entirely satisfactory since a relatively large amount of water is required and the subsequent separation of the water from the phenol presents serious problems.

I have now discovered a process of recovering the primary solvent in a highly purified state in an economical manner without the necessity of distilling the same. My process comprises a two-stage operation in which a heated aqueous inert salt solution is added to the respective phases. The hot aqueous inert salt solution is completely miscible with the selective solvent and causes substantially complete precipitation of the oil from the resulting solvent aqueous salt solution phase. The raffinate and extract are separated from the solvent aqueous salt solution phase, which latter phase is then cooled, thus causing the formation of an aqueous inert salt layer and a primary selective solvent layer. The selective solvent is separated from the aqueous inert salt layer and recycled to the system, either with or without further drying.

The process of my invention may be readily understood by reference to the attached drawing illustrating one modification of the same. Feed oil, which for the purposes of description is assumed to be a petroleum lubricating oil, is introduced into primary extract tower 1 by means of feed line 2. The feed oil flows upwardly through tower 1 and contacts downflowing solvent which is introduced into tower 1 by means of feed line 3. The solvent, for the purposes of description, is taken to be phenol. Temperature and pressure conditions in tower 1 are adapted to secure the formation of a solvent poor or raffinate phase and a solvent rich or solvent extract phase. Water which may contain some phenol, may be introduced into tower 1 at a plurality of stages, preferably above and below the oil feed inlet, by means of lines 4, 5, 6, 7, and 8 respectively. The raffinate phase is withdrawn from tower 1 by means of line 9 and pump 10. The raffinate phase is then mixed with a sufficient quantity of aqueous inert salt solution which is introduced by means of line 11. For the purposes of description the aqueous inert salt solution is taken to be an aqueous solution of sodium chloride. The mixture passes through heater or cooler 12, through mixer 13, and then into separator 14. The oil phase containing a relatively small amount of phenol is withdrawn from separator 14 by means of line 15, heated by means of heater 16 and then introduced into raffinate stripper 17. Steam is introduced into raffinate stripper 17 by means of line 18 in order to remove the last traces of phenol. The solvent-free raffinate is withdrawn from raffinate stripper 17 by means of line 19. The solvent and steam are removed from raffinate stripper 17 by means of line 20, condensed in condenser 21 and then mixed with the phenol-water-salt phase which is withdrawn from separator tank or centrifuge 14 by means of line 22. The solvent extract phase is withdrawn from tower 1 by means of line 23 and treated in a similar manner. The solvent extract is mixed with a sufficient quantity of an aqueous solution of sodium chloride introduced into line 23 by means of line 24. This mixture is then heated or cooled in 25, passed through mixer 26 and then introduced into extract separator 27.

The oil phase containing a relatively small amount of the solvent is withdrawn from extract separator 27 by means of line 28, heated in heater 29, and then introduced into extract stripper 30. It may be desirable to return a portion of the oil phase to tower 1 by means of line 31. Steam is introduced into extract stripper 30 by means of line 32 in order to remove the last traces of solvent from the extract. Solvent-free extract is withdrawn from extract stripper 30 by means of line 33 and the stripped solvent and steam removed overhead by means of line 34. The phenol-water-salt phase is removed from extract settling tank or centrifuge 27 by means of line 35 and mixed with the solvent-water-salt phase withdrawn from raffinate settling tank or centrifuge 14 along with the overhead removed from extract stripper 30 by means of line 34. The combined solvent-water-salt phases from separator tanks 14 and 27 along with the overheads from raffinate stripper 17 and extract stripper 30 are then chilled in chiller 36 and introduced into solvent, aqueous salt solution separator 37 by means of line 38. The aqueous salt solution is removed from separator 37 by means of line 39 and introduced into aqueous salt solution storage 40. The phenol layer from separator 37 is introduced into phenol drier 41 by means of line 42. Phenolic water is removed overhead from drier 41 and is preferably introduced into the countercurrent treating tower 1 by means of line 43. If an excess of water be removed overhead from solvent drier 41, the excess may be introduced into aqueous salt solution storage 40 by means of line 44. Phenol containing a small amount of water and a concentrated solution of salt in water is withdrawn from drier 41 and introduced into separator 45 by means of line 46. The water phase containing the concentrated salt is removed from separator 45 by means of line 47 and introduced into aqueous salt storage 40. The phenol substantially free of water, oil and salt is recycled to line 3 by means of line 48. Fresh phenol may be introduced into the system by means of line 49.

The conditions and method of operating in accordance with the present invention may be widely varied. The invention is applicable in the solvent treatment of petroleum oils, although particularly desirable results are secured in the treatment of petroleum oils boiling in the lubricating and gas oil ranges. The invention is particularly applicable in the removal of selective solvents of the character of furfural or in the removal of phenolic type solvents, as for example, phenol, cresols, and the like. The aqueous salt solution with respect to the particular salt being used, the concentration of the salt in the solution, and the quantity of the solution used per volume of oil being removed likewise may vary considerably. Satisfactory salts are those salts which are inert and will not react with the particular selective solvent, as for example, sodium chloride, potassium chloride, or sodium sulphate.

The quantity of primary solvent used will vary considerably, depending upon the particular solvent used, as well as upon the petroleum oil being treated and the yield and quality of products desired. In general, it is preferred to use from one-half to four volumes of solvent per volume of oil being treated, although as much as ten volumes or more of solvent can also be used since excessive distillation costs are avoided by my process.

It is preferred to introduce the solvent either dry or containing a low concentration of water at one end of the countercurrent treating system which may be either a column or a series of stages. Water is injected preferably at a plurality of points above or below or on each side of the stage at which the feed oil is introduced. The quantity of water introduced will depend upon the oil being treated, the solvent being used, as well as upon the temperature and pressure conditions employed. When treating a lubricating oil distillate with phenol, it is preferred to introduce from 3% to 15% of water, based upon the solvent being used. Temperature and pressure conditions in the countercurrent treating system will likewise vary, depending upon the solvent being used, the character of the oil being treated, and the yield and quality of products desired. In general, atmospheric pressure or a pressure sufficient to maintain all materials in the liquid phase and a temperature below the complete miscibility temperature and above the melting point of the solvent are employed. For example, when employing phenol as the selective solvent, it is preferred to maintain a temperature throughout the tower in the range from about 80° F. to 250° F.

The amount of aqueous salt solution added to the raffinate phase will depend upon the above named factors and upon the concentration of the salt present. In general, it is preferred to add from 10% to 20% of sodium chloride solution, based upon the total quantity of raffinate. The raffinate phase and the salt water are then heated to a temperature at which an oil phase will separate substantially free of solvent. It has been found, for example, that when 10% to 20% of 1.5 to 2.0% concentrated sodium chloride solution is added, based upon the total volume of raffinate, and when using phenol as the selective solvent, especially desirable results are secured when the mixture is heated to a temperature in the neighborhood of about 200° F. The concentration of sodium chloride in the aqueous salt solution should be in the range from about ½% to 4% and should preferably not exceed about 2%. The temperatures maintained in the raffinate stripper and the quantity of steam introduced into said stripper are adjusted to produce a solvent-free raffinate.

The quantity of salt solution added to the solvent extract phase likewise will depend upon the above named factors. The quantity of water added, based upon the total volume of solvent extract, may vary from about 50% to 400%. However, in order to secure a desirable economical operation, the quantity of salt solution added should not exceed 200%, based upon the total quantity of solvent extract. The solvent extract phase after the addition of the sodium chloride solution is heated to a temperature at which an oil phase substantially free of solvent will be secured. When using phenol as the selective solvent and when adding from 50% to 150% by volume of sodium chloride solution, based upon the total volume of extract phase, it has been found that desirable results are secured by heating the aqueous salt extract mixture to a temperature in the range from about 175° F. to 225° F. The temperature of the extract stripper and the quantity of steam introduced into said stripper are adjusted to produce a solvent-free extract.

The invention, however, is particularly directed and applicable in the removal of phenol from the respective phases by means of an aqueous sodium chloride solution, in which case the concentration of the sodium chloride in the solution and the operating temperature are critical. I have found that in order to secure satisfactory results, the concentration of the sodium chloride should be in the range of about 1½% to 2%. I have also found that at a temperature in the range from about 175° F. to 225° F., preferably at a temperature of about 200° F., phenol is completely miscible and soluble to the exclusion of oil in an aqueous sodium chloride solution of the above-mentioned concentration, and at a temperature in the range from about 75° F. to 125° F. is substantially fully precipitated from said sodium chloride solution.

In order to further illustrate the invention the following examples are given which should not be construed as limiting the same in any manner whatsoever:

*Example 1*

Several operations were conducted in recovering spent phenol containing 12% extract in which various amounts of water containing different percentages of sodium chloride were used in removing the selective solvent from the oil. These operations were conducted at 200° F. with the results as follows:

TABLE 1

| Volume percent salt water (based on solvent extract phase) | Percent sodium chloride in wash water | Percent oil in recovered phenol |
| --- | --- | --- |
| 100 | 0 | 4.5 |
| 100 | 1.0 | 3.0 |
| 100 | 2.0 | 2.5 |
| 200 | 0 | 4.0 |
| 200 | 1.0 | 2.5 |
| 200 | 2.0 | 1.5 |
| 400 | 0 | 4.0 |
| 400 | 1.0 | 2.5 |
| 400 | 2.0 | 1.5 |

From the above data it is to be observed that the amount of oil in the recovered phenol was reduced 40% when using 200 volume per cent of a 2% sodium chloride solution.

It was noticed that a clear separation of oil from the phenol was not obtained with pure water, even when large amounts were used, while the addition of a small amount of sodium chloride resulted in a clear separation.

*Example 2*

The effect of the salt concentration on the settling time was determined using a 400% wash at 200° F. on a spent phenol containing 12% oil.

TABLE 2

| Percent NaCl in wash | Volume percent oil separated | | | |
| --- | --- | --- | --- | --- |
|  | 1 min. | 5 min. | 15 min. | 30 min. |
| 0 | 25 | 40 | 50 | 75 |
| 1.00 | 85 | 85 | 90 | |

It will be noted that only about 50% of the oil is removed in 15 minutes settling time when pure water is used, while nearly complete removal is obtained when 1.0% salt is added to the water.

*Example 3*

A petroleum oil having a gravity of about 25° A. P. I., a Saybolt viscosity of 450 seconds at 100° F., and about 60 seconds at 200° F. when treated with 2 parts by volume of phenol at a temperature of about 140° F. in accordance with the process of the present invention results in the following material balance:

TABLE 3

*Primary extraction tower*

|  | Total volumes feed | | | Total withdrawn | |
| --- | --- | --- | --- | --- | --- |
|  | Oil | Phenol | Water injected | Raffinate phase | Extract phase |
| Oil | 100 | 2 |  | 75 | 27 |
| Phenol |  | 200 | 1 | 25 | 176 |
| Water |  |  | 10 |  | 10 |
|  | 100 | 202 | 11 | 100 | 213 |
| Total |  | 313 | | 313 | |

*Raffinate separator*

|  | Feed | | | Phases withdrawn | |
| --- | --- | --- | --- | --- | --- |
|  | Raffinate phase from tower | 2% sodium chloride water injected | Total feed | Raffinate phase | Phenol-water phase |
| Oil | 75 |  | 75 | 75 |  |
| Phenol | 25 | 1.5 | 26.5 | 2 | 24.5 |
| Water |  | 15 | 15 |  | 15 |
|  | 100 | 16.5 | 116.5 | 77 | 39.5 |
| Total | | 116.5 | | 116.5 | |

*Raffinate stripper*

|  | Feed | | Withdrawn | |
| --- | --- | --- | --- | --- |
|  | Raffinate phase | Steam | Raffinate | Overhead |
| Oil | 75 |  | 75 |  |
| Phenol | 2 |  |  | 2 |
| Water |  | 2 |  | 2 |
|  | 77 | 2 | 75 | 4 |
| Total | | 79 | | 79 |

*Extract separator*

|  | Feed | | | Phases withdrawn | |
| --- | --- | --- | --- | --- | --- |
|  | Extract phase | Water injected | Total | Extract phase | Phenol-water phase |
| Oil | 27 |  | 27 | 25 | 2 |
| Phenol | 176 | 17.5 | 193.5 | 2 | 191.5 |
| Water | 10 | 175 | 185 |  | 185 |
|  | 213 | 192.5 | 405.5 | 27 | 378.5 |
| Total | | 405.5 | | 405.5 | |

*Extract stripper*

|  | Feed | | Withdrawn | |
| --- | --- | --- | --- | --- |
|  | Extract Phase | Steam | Extract | Overhead |
| Oil | 25 |  | 25 |  |
| Phenol | 2 |  |  | 2 |
| Water |  | 2 |  | 2 |
|  | 27 | 2 | 25 | 4 |
| Total | | 29 | | 29 |

*Feed to phenol-sodium chloride solution separator*

|  | Phenol-water phase from extract separator | Phenol-water phase from raffinate separator | Overhead from raffinate stripper | Overhead from extract stripper | Total feed |
| --- | --- | --- | --- | --- | --- |
| Oil | 2 |  |  |  | 2 |
| Phenol | 191.5 | 24.5 | 2 | 2 | 220 |
| Water | 185 | 15 | 2 | 2 | 204 |
|  | 378.5 | 39.5 | 4 | 4 | 426 |

*Withdrawn from phenol sodium chloride separator*

|  | Aqueous sodium chloride to storage | Phenol water phase to phenol drier |
| --- | --- | --- |
| Oil |  | 2 |
| Phenol | 19 | 201 |
| Water | 192 | 12 |
|  | 211 | 215 |
| Total | 426 | |

*Phenol drier*

|  | Withdrawn | | |
| --- | --- | --- | --- |
|  | Feed | Recycled phenolic water | Bottoms from phenol drier to concentrated solution separator |
| Oil | 2 |  | 2 |
| Phenol | 201 | 1 | 200 |
| Water | 12 | 10 | 2 |
|  | 215 | 11 | 204 |

The process of the present invention is not to be limited in any manner whatsoever, but only by the following claims in which it is intended to claim all novelty in so far as the prior art permits.

I claim:

1. Process for the removal of the selective solvent from the raffinate and extract phases respectively secured in the solvent treatment of mineral oils when utilizing a water soluble selective solvent comprising treating the respective phases with a hot aqueous inert inorganic salt solution under conditions to separate an oil phase and a selective solvent aqueous salt solution phase, separating and cooling said latter phase whereby a selective solvent phase and an aqueous salt solution phase form, separating said latter phases and recycling the same to said solvent treating process.

2. Process in accordance with claim 1 in which said selective solvent is a phenol.

3. Process in accordance with claim 1 in which said selective solvent is a phenol and said inert salt is sodium chloride.

4. Process for the removal of phenol from the raffinate and extract phases respectively secured in the solvent treatment of mineral oils comprising treating the respective phases with a hot sodium chloride solution, said concentration of sodium chloride being in the range from 1½% to 4% under conditions to separate an oil phase and a phenol sodium chloride solution phase, separating and cooling said latter phase whereby a phenol phase and an aqueous sodium chloride solution phase form, separating said latter phases and recycling the same to said solvent treating process.

5. Process in accordance with claim 4 in which the concentration of said salt solution is in the range from 1½% to 2%.

6. Solvent treating process comprising countercurrently contacting a petroleum oil with phenol under conditions to form a solvent extract phase and a raffinate phase, separating the respective phases and treating the same at a temperature in the range between about 175° F. to 225° F. with an aqueous sodium chloride solution, the concentration of sodium chloride being in the range from 1½% to 2%, whereby an oil phase and a phenol sodium chloride solution phase form, separating the phenol sodium chloride phase and cooling to a temperature of about 100° F. whereby a phenol phase and a sodium chloride solution phase form, separating said latter phases and recycling the same.

7. A process according to claim 6 wherein about 10% to 20% of the aqueous sodium chloride solution is added to the raffinate phase and about 50% to 200% of the aqueous sodium chloride solution is added to the extract phase.

EDWARD D. REEVES.